United States Patent
Ravichandran

(10) Patent No.: US 7,802,116 B2
(45) Date of Patent: Sep. 21, 2010

(54) SUBSYSTEM POWER MANAGEMENT

(75) Inventor: Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 884 days.

(21) Appl. No.: 11/535,751

(22) Filed: Sep. 27, 2006

(65) Prior Publication Data

US 2008/0077816 A1  Mar. 27, 2008

(51) Int. Cl.
G06F 1/32 (2006.01)
(52) U.S. Cl. .................. 713/320; 713/300; 713/322; 712/1
(58) Field of Classification Search .......... 713/320, 713/1, 2, 300, 500, 400, 322; 712/1
See application file for complete search history.

(56) References Cited

U.S. PATENT DOCUMENTS

| 4,204,249 | A | * | 5/1980 | Dye et al. ............. 713/330 |
| 5,495,205 | A | | 2/1996 | Parker et al. |
| 5,805,880 | A | * | 9/1998 | Pearce et al. ............. 713/2 |
| 5,887,179 | A | * | 3/1999 | Halahmi et al. ........ 713/324 |
| 5,933,058 | A | | 8/1999 | Pinto et al. |
| 6,870,432 | B2 | | 3/2005 | Li et al. |
| 6,938,176 | B1 | * | 8/2005 | Alben et al. ............. 713/323 |
| 7,129,751 | B2 | | 10/2006 | Jahan et al. |
| 7,222,244 | B2 | * | 5/2007 | Kawahara et al. ........... 713/300 |
| 7,274,229 | B1 | | 9/2007 | Humphreys et al. |
| 7,342,417 | B2 | | 3/2008 | Jahan et al. |
| 7,472,296 | B2 | * | 12/2008 | Kato et al. ............. 713/320 |
| 2002/0152410 | A1 | * | 10/2002 | Clark et al. ............. 713/320 |
| 2005/0228967 | A1 | * | 10/2005 | Hirairi ..................... 712/1 |
| 2005/0268141 | A1 | * | 12/2005 | Alben et al. ............. 713/500 |
| 2007/0157036 | A1 | | 7/2007 | Jahagirdar et al. |
| 2008/0002801 | A1 | | 1/2008 | Droege et al. |
| 2008/0155170 | A1 | | 6/2008 | Jahan et al. |

OTHER PUBLICATIONS

Non-Final Office Action received for U.S. Appl. No. 11/478,268, mailed on Mar. 3, 2010, 10 Pages.
"PCI Express Base Specification Revision 1.0 a", PCI Express,Apr. 15, 2003, 428 pages.
"Unified Extensible Firmware Interface Specification", Version 2.0, First Release, Jan. 31, 2006, 1437 pages.

* cited by examiner

Primary Examiner—Thomas Lee
Assistant Examiner—Zahid Choudhury
(74) Attorney, Agent, or Firm—Grossman, Tucker, Perreault & Pfleger, PLLC

(57) ABSTRACT

A method according to one embodiment may include generating, by subsystem voltage regulator circuitry, a subsystem power supply for subsystem circuitry based on, at least in part, a main power supply; detecting, by subsystem power management circuitry, the activity of the subsystem circuitry, and turning off the subsystem power supply, by the subsystem power management circuitry, if the subsystem circuitry is inactive.

22 Claims, 9 Drawing Sheets

900

Restoring state information stored in at least one memory storage element of subsystem circuitry if subsystem power management circuitry detects activity of the subsystem circuitry
902

Controlling subsystem voltage regulator circuitry, by subsystem power management circuitry, to turn on a subsystem power supply if activity of subsystem circuitry is detected
904

FIG. 9

SUBSYSTEM POWER MANAGEMENT

FIELD

The present disclosure relates to subsystem power management.

BACKGROUND

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 9 depicts another flowchart of exemplary operations consistent with the present disclosure.

Although the following Detailed Description will proceed with reference being made to illustrative embodiments, many alternatives, modifications, and variations thereof will be apparent to those skilled in the art.

DETAILED DESCRIPTION

Figure 1:
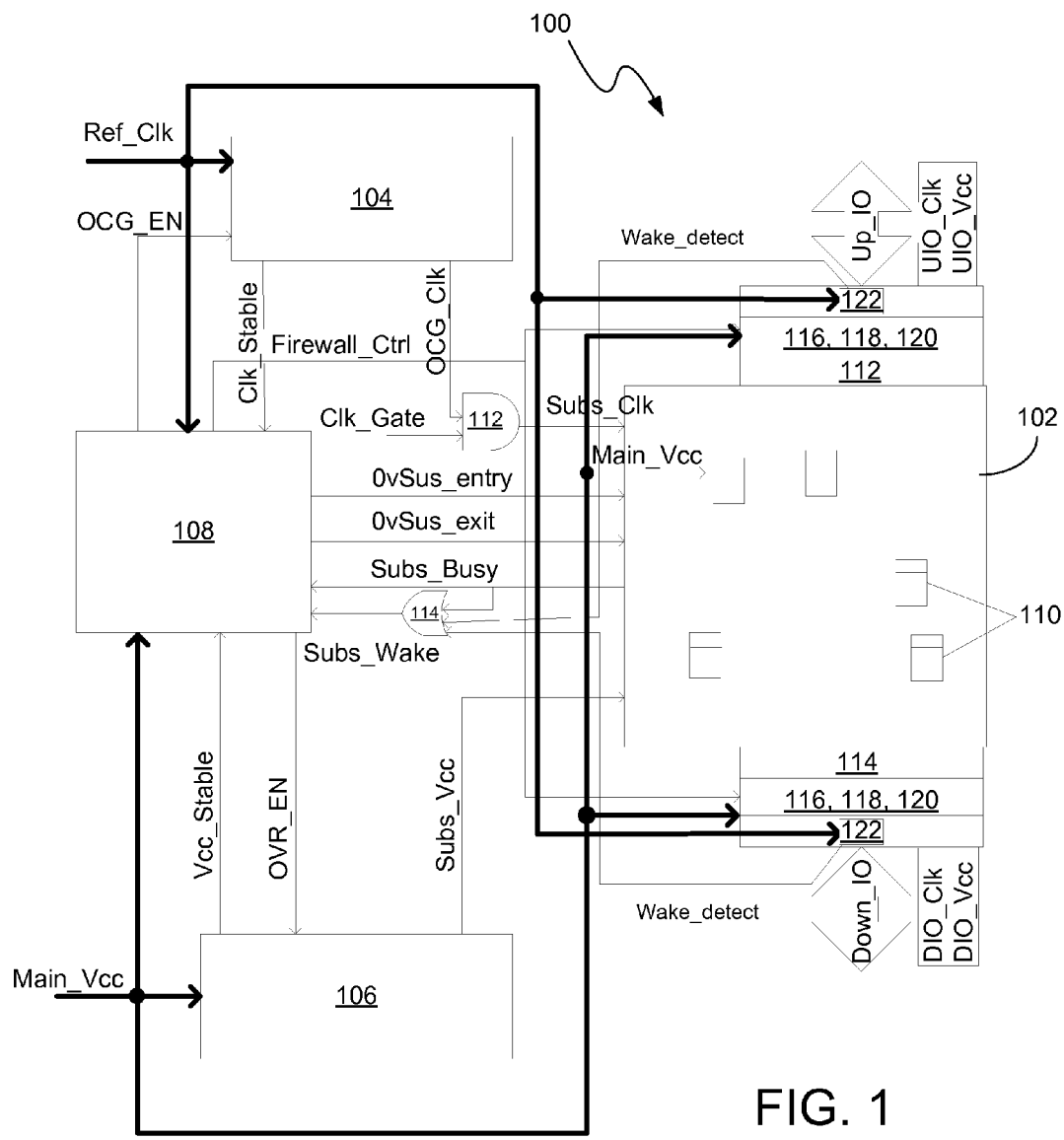
FIG. 1 is a diagram illustrating one exemplary embodiment.

FIG. 1 illustrates a block diagram of one exemplary subsystem 100 consistent with this disclosure. Subsystem 100 may include subsystem circuitry 102, subsystem clock generator circuitry 104, subsystem voltage regulator circuitry 106 and subsystem power management circuitry (SPMC) 108. As will be described in greater detail below, SPMC 108 may be configured to detect the activity state of subsystem circuitry 102, and, depending on the activity state of subsystem circuitry 102, control the subsystem circuitry to retain state information stored in the subsystem circuitry and remove subsystem power and clocking from the subsystem circuitry 102.

Subsystem circuitry 102 may be configured to perform at least one function of a larger system, for example, subsystem circuitry 102 may be configured to perform at least one function of a central processing unit (CPU), system on chip (SoC), chipset circuitry and/or other integrated circuit (IC). For example, subsystem circuitry 102 may be configured to operate as a bus controller, floating point unit, display controller, audio controller, etc. Of course, these are only example of the types of functions that may be performed by subsystem circuitry 102. Thus, "subsystem circuitry", as used in any embodiment herein, is intended to be construed broadly as including any subsystem of a system that is configured to perform at least one function of that system.

Subsystem circuitry 102 may include interface circuitry, for example, upstream interface circuitry 112 and downstream interface circuitry 114. Interfaces 112 and 114 may be configured to communicate with other subsystems and/or I/O devices and/or processors and/or memory devices, etc. Although two interfaces are shown in FIG. 1, it is envisioned that any number of interfaces could be used. Subsystem circuitry 102 may also include at least one memory storage element 110. As will be described in greater detail below, memory storage element 110 may be configured to retain state information stored therein when a subsystem voltage supplied thereto is switched off.

Subsystem circuitry 102 may also include level shifting circuitry 116 that may be configured to reduce leakage current and provide firewall protection between circuitry of the same or different voltages (e.g., when a voltage domain is in a standby or idle mode). For example, level shifting circuitry 116 may be configured to perform voltage level translation operations between an interface voltage and a subsystem voltage. Subsystem circuitry 102 may further include clock synchronization circuitry 118 that may be configured to address timing issues and/or clock skew the subsystem 102 and other components coupled to the subsystem 102, via interface circuitry 114. For example, clock synchronization circuitry 118 may latch and propagate signals crossing to/from the clock domain of the subsystem circuitry 102 and the clock domain of the component coupled to the subsystem (e.g. UIO_Clk). Synchronization circuitry 118 may be configured to operate with a variety of different synchronization schemes, including, but not limited to, fully synchronous, locally synchronous, global asynchronous-locally synchronous (GALS), self-timed systems and wavefront processing. Additionally, level shifting circuitry 116 may either couple or decouple input circuitry from a reference voltage in response to a Firewall_Ctrl signal, may translate signals between a first voltage domain and a second voltage domain when the Firewall_Ctrl signal is deasserted, and may generate an output signal having a predetermined high or low state when the Firewall_Ctrl signal is asserted.

Subsystem circuitry 102 may also include firewall circuitry 120. Firewall circuitry 120 may isolate the subsystem 100 from other components coupled to the subsystem 100, to prevent, for example a current drain path that could cause a short circuit or excessive current. Subsystem circuitry 102 may also include wake detect circuitry 122. Wake detect circuitry 122 may be configured to detect any transaction on interfaces 112 and/or 114 that may require a response from subsystem circuitry 102. Wake detect circuitry 122 may be powered by a voltage (e.g. Main_Vcc) and may be configured to receive a reference clock signal (e.g., Ref_Clk). If a wake event is detected, wake detect circuitry 122 may generate a wake detect signal (e.g., Wake_detect signal).

Clock generator circuitry 104 may be configured to generate a subsystem clock (OCG_clk) based on a reference clock (Ref_clk) and a clock enable signal from SPMC 108 (OCG_EN). The OCG_EN signal may control the on and/or off state of the clock generator 104. Clock generator 104 may also generate a signal Clk_Stable to indicate to SPMC 108 that the clock has reached a stable, target clock frequency. SPMC 108 may generate Clk_gate control signal. AND gate 112 may be configured to AND the Clk_gate control signal and the OCG_Clk signal. If the Clk_gate signal is enabled (high), then the output of AND gate 112 may be the subsystem clock signal Subs_clk. If the Clk_gate signal is disabled (low), then the output of AND gate 112 may be low, indicating no clock is supplied to subsystem 102 (as may be the case in one or more power management modes, as described below).

Voltage regulator circuitry 106 may be configured to generate one or more voltage levels to deliver power to subsystem 102. In one embodiment, voltage regulator 106 may be configured to receive a system voltage supply (Main_Vcc) and convert the system voltage supply to a subsystem power supply Subs_Vcc. Voltage regulator may comprise a DC-to-DC converter, which may include, for example, well known converter topologies such as a Buck, boost and/or Buck/boost converter. In some embodiments, regulator 106 may take a standard platform voltage (e.g. 1.8 volts) and generate an accurate configurable voltage (e.g., 1.05 v, 1.3 v, 1.5 v, etc.) for use with subsystem 102. For example, if Main_Vcc was 1.8 volts and subsystem logic required 1.05 volts, then voltage regulator 106 may regulate from 1.8 volts to 1.05 volts.

Further, voltage regulator 106 may be turned on/off using the signal OVR_EN, which may be generated by SPMC 108. Voltage regulator 106 may generate and deliver a signal (Vcc_Stable) to SPMC 108. Vcc_Stable may provide an indication when the Subs_Vcc of subsystem 102 has reached a specified level. For example, if the specification for subsystem 102 required 1.05 volts at a tolerance of ±5%, then Vcc_Stable should be asserted when Subs_Vcc crosses 1.05 volts minus 5% (i.e., approximately 0.9975 volts). Voltage regulator 106 may be implemented in a variety of different arrangements, such as, for example a buck voltage regulator in an on-die semiconductor device (e.g., a Metal Oxide Semiconductor (MOS) configuration).

SPMC 108 may be configured to detect the activity of subsystem circuitry 102. Subsystem circuitry 102 may generate a signal (e.g., Subs_Busy signal) indicative of activity or inactivity of subsystem circuitry 102. If enabled, the Subs_Busy signal may be indicative of ongoing activity of subsystem circuitry 102, for example, an I/O transaction or any internal operation (e.g., an internal microcontroller processing an instruction stream). When Subs_busy is deasserted it may indicate that subsystem circuitry 102 is in an idle (inactive) state. Other components of the subsystem circuitry 102 may also be configured to generate a signal indicative of activity of the subsystem circuitry 102. For example, wake detection circuitry 122 may be configured to generate a signal (e.g., Wake_detect signal) indicative of, for example, an I/O request, directed to subsystem circuitry 102, from another susbsystem coupled to subsystem 100. OR gate 114 may be configured to OR the Subs_Busy signal and the Wake_detect signal, and generate a Subs_Wake signal indicative of activity of the subsystem circuitry 102. If, for example, the subsystem circuitry 102 and the wake detection circuitry 122 are inactive, the Subs_Wake signal may be deasserted, indicating the subsystem circuitry 102 is inactive. If either the subsystem circuitry 102 or the wake detection circuitry 122 are active, the Subs_Wake signal may be asserted, indicating the subsystem circuitry 102 is active.

In response to the Subs_wake signal and/or the Subs_busy signal (indicating activity of the subsystem circuitry 102), SPMC 108 may be configured to control the operation of the subsystem circuitry 102, the subsystem voltage regulator circuitry 106 and/or the subsystem clock generator circuitry 104. For example, if the Subs_wake signal and/or the Subs_busy signal is indicative of inactivity of the subsystem circuitry 102, SPMC 108 may be configured to control subsystem voltage regulator circuitry 106 to turn off the susbsystem power supply (Subs_Vcc). Additionally, if the Subs_wake signal and/or the Subs_busy signal is indicative of inactivity of the subsystem circuitry 102, SPMC 108 may be configured to control subsystem clock generator circuitry 104 to turn off the subsystem clock (OCG_clk). To that end, SPMC 108 may be configured to deassert the Clk_Gate signal so that the output of AND gate 112 is low (i.e., the Subs_clk signal is turned OFF). Alternatively or additionally, SPMC 108 may be configured to deassert the OCG_en signal to turn off the subsystem clock generator circuitry 104, and thus, turn off the subsystem clock signal OCG_clk.

If SPMC 108 detects inactivity of subsystem circuitry 102, SPMC 108 may also generate a signal to cause the subsystem circuitry to enter a low power state. For example, SPMC 108 may be configured to generate a 0vsus_entry signal to cause subsystem circuitry 102 to enter into a 0 Volt suspend state. Since, in this low power state the subsystem power supply (Subs_Vcc) may be turned off (as described above), the subsystem 100 may be configured to route the main power supply (Main_Vcc) to at least one memory storage element 110. Accordingly, when the subsystem power supply 106 is turned off, the memory storage element 110 may retain state information stored therein. Additionally, the 0vsus_exit signal may be routed to some or all of the memory storage elements 110 in order to control a save state and/or restore state.

If SPMC 108 detects activity of subsystem circuitry 102 (for example, if Subs_busy and/or Wake_detect signals are asserted), SPMC 108 may be configured to control subsystem voltage regulator circuitry 106 to turn on the subsystem power supply (Subs_Vcc). If SPMC 108 detects activity of subsystem circuitry (for example, if Subs_busy and/or Wake_detect signals are asserted), SPMC may be configured to control subsystem clock generator circuitry 104 to turn on the subsystem clock (OCG-Clk). Additionally, SPMC 108 may be configured to cause the subsystem circuitry 102 to exit the 0 Volt suspended state, for example, by generated a 0VSus_exit signal. When exiting from a 0 Volt suspended state, subsystem circuitry 102 may be configured to restore the state information stored in one or more memory storage elements 110.

As stated, subsystem circuitry 102 may include at least one memory storage element 110. In one embodiment, memory storage element 110 may include an ultra drowsy flip-flop (UDFF). The term "drowsy" as used herein, may refer to a mode of operation where the power supply is still on but the voltage is reduced so that the difference between a "1" voltage level and a "0" voltage level may be smaller than it would be in normal operation. An UDFF 110 may be configured to store configuration values that are used by subsystem circuitry 102 during operation, and the configuration values may be initialized by an operating system (OS, not shown in this figure) or drivers (not shown in this figure). Subsystem circuitry 102 may retain these values and these values may remain unchanged unless modified by the operating system and/or drivers. In some embodiments the configuration bits may be stored within the cells of UDFFs 110 and updated during normal execution. In some embodiments, Main_Vcc may be routed to some or all of the UDFF's 110 of subsystem circuitry 102. This may allow a UDFF 110 to retain a memory state when the subsystem power supply (Subs_Vcc) from voltage regulator circuitry 106 is turned off. Further, the power drain on Main_Vcc caused by the UDFFs 110 may be virtually negligible (i.e., only required to support leakage loss in the latch). In some embodiments, the UDFFs may be synthesized as part of the existing register transfer level (RTL).

Figure 2:
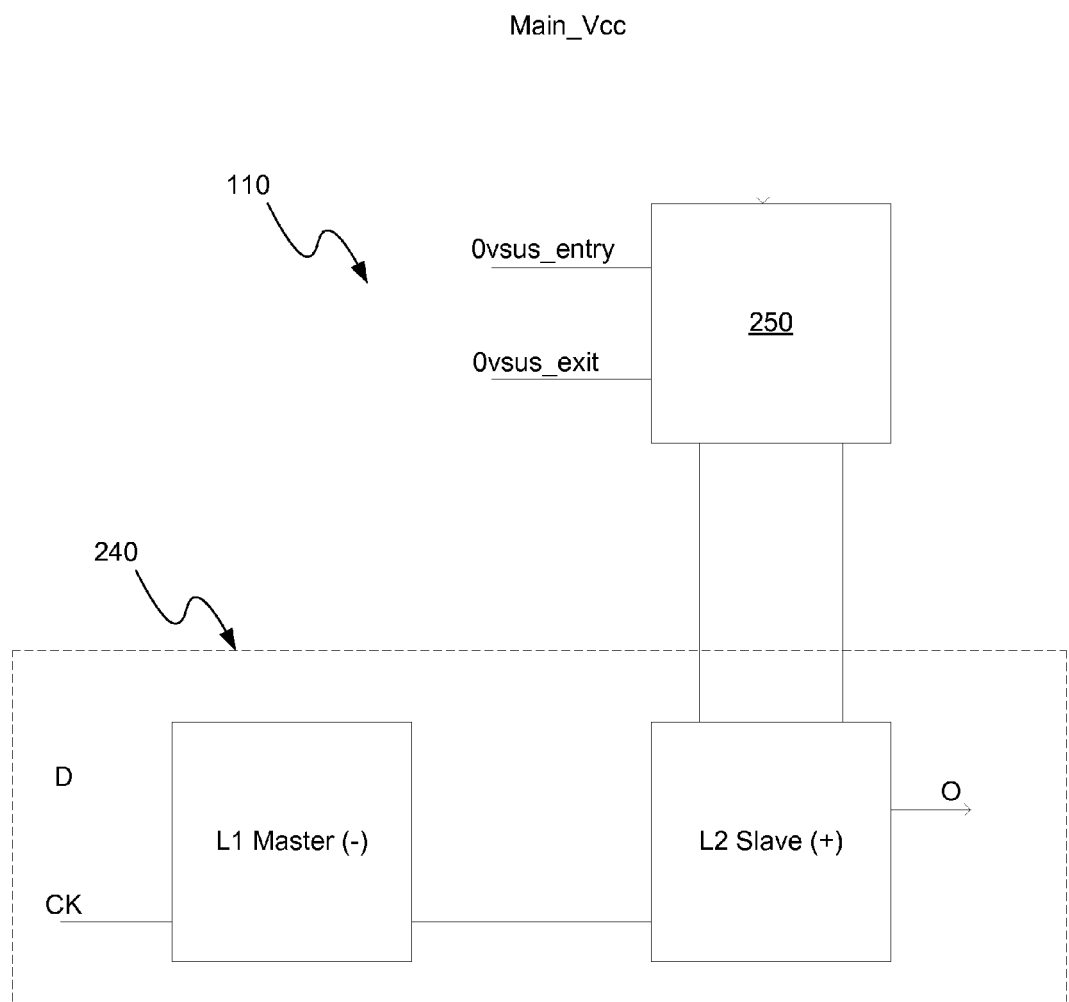
FIG. 2 is a diagram illustrating a block diagram of a flip-flop in accordance with FIG. 1.

FIG. 2 shows a block diagram of one exemplary UDFF 110 in accordance with one exemplary embodiment. A master-slave flip-flop configuration 240 is shown coupled to an additional state retention latch 250. Although a D flip-flop is shown, other latches and/or flip-flops may be used without departing from the scope of the present disclosure. State retention latch 250 may be configured to communicate with SPMC 108 via signals 0vsus_entry and 0vsus_exit. State retention latch 250 may also be configured to receive a power source such as Aux Vcc (e.g. Main_Vcc).

Figure 3:
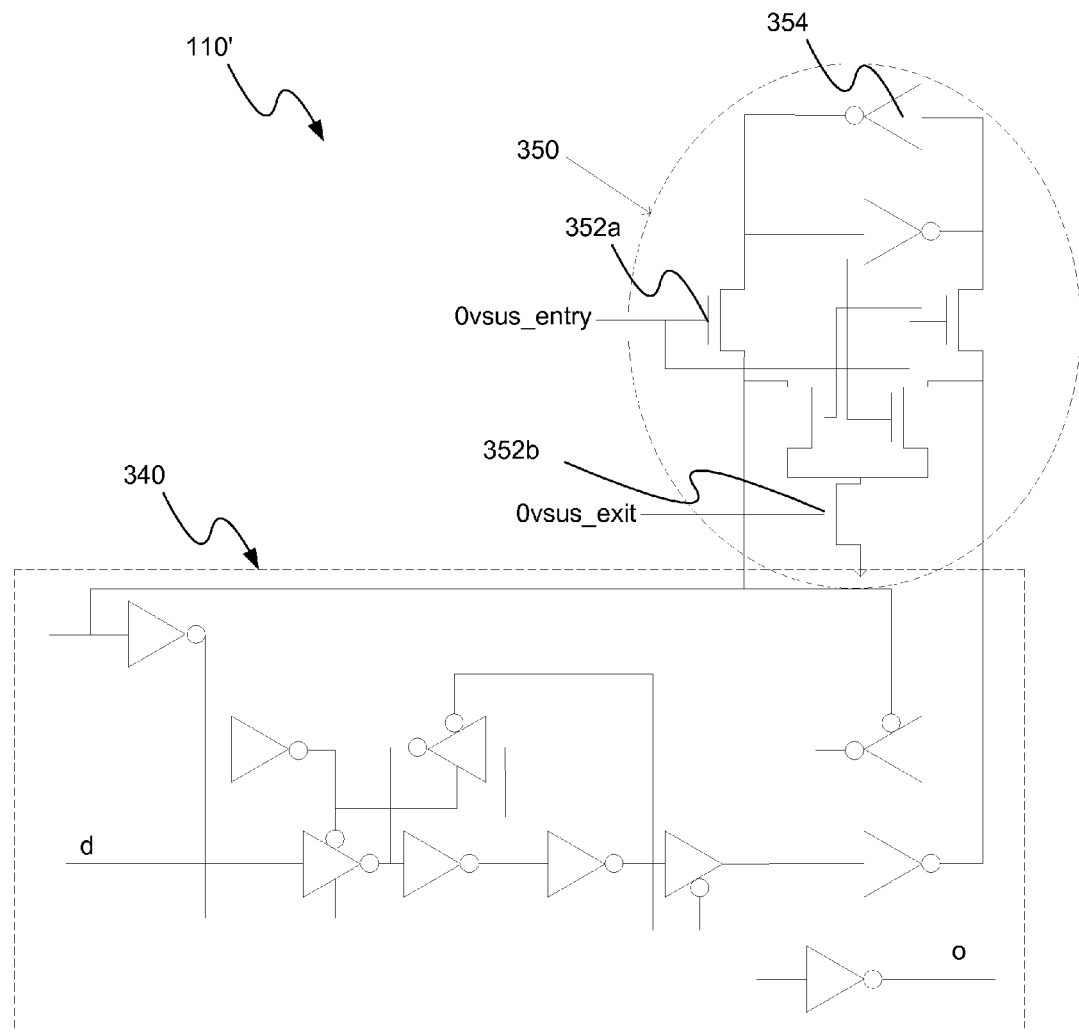
FIG. 3 is a diagram illustrating in more detail a flip-flop in accordance with FIGS. 1-2.

A more detailed illustration of a UDFF 110' according to another exemplary embodiment is shown in FIG. 3. The encircled portion of FIG. 3 corresponds to a state retention latch 350. Each UDFF 310 may include a series of transistors 352, which may be coupled with inverters 354 or other devices. Signals 0vsus_entry and 0vsus_exit from SPMC 108 are shown entering the gates of two separate transistors, 352a and 352b respectively. A master-slave configuration 340 is shown connected to state retention latch 350. Of course, the configuration of the circuitry of FIG. 3 may be arranged in a variety of different configurations without departing from the scope of this disclosure.

Figure 4:
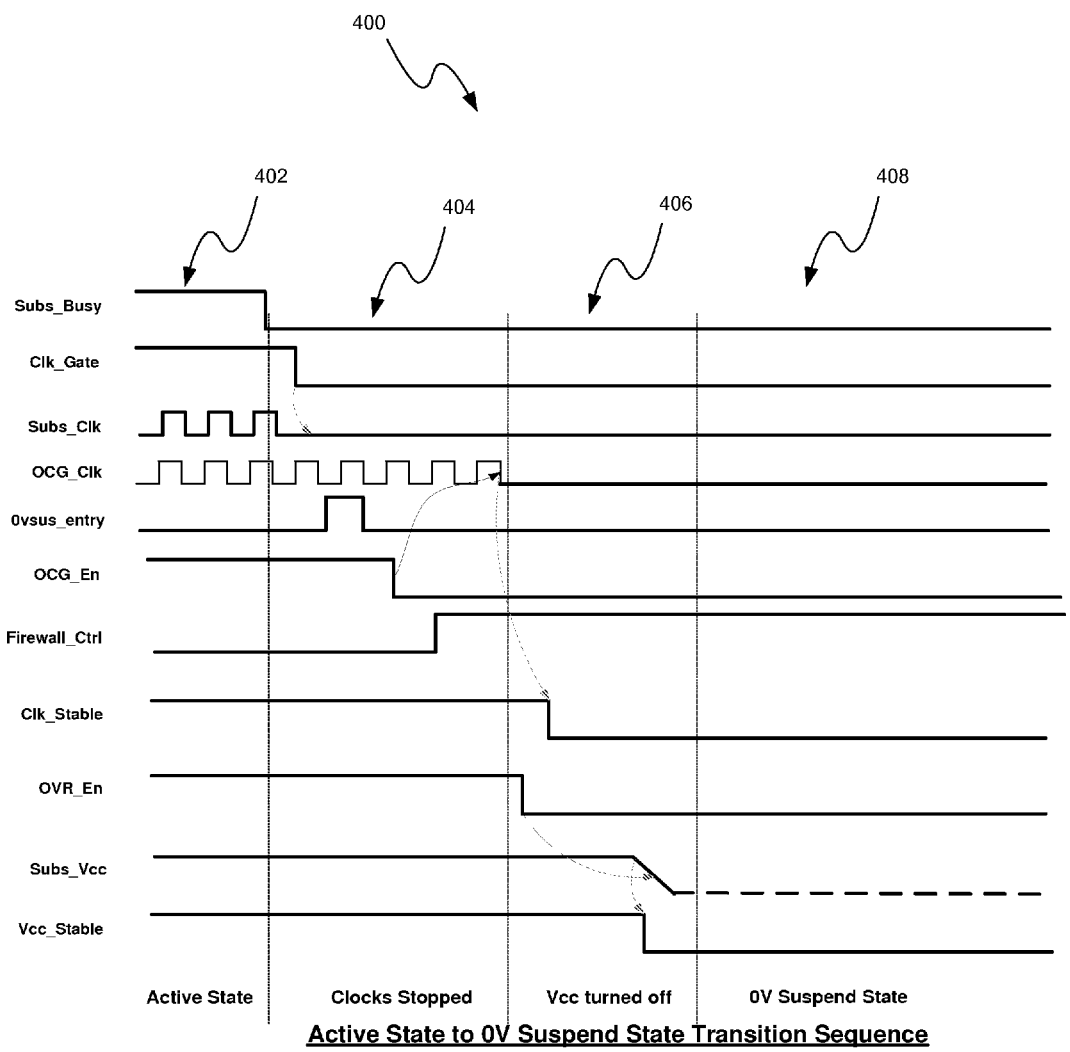
FIG. 4 is a timing diagram illustrating a transition sequence from an active state to a suspended state.

FIG. 4 depicts one exemplary timing diagram 400 of a transition from an active state to the 0v suspend state. The transition sequence shows the signals at a number of different intervals (i.e., active state 402, clock stopped 404, Vcc off 406 and the 0v suspend state 408). In operation, if subsystem 102 has completed all of its internal and external transactions it may de-assert the Subs_Busy signal. SPMC 108 may then deassert the Clk_Gate signal to prevent the clock from communicating with the subsystem and assert the 0vsus_entry signal to enable UDFF 110 content to be saved. SPMC 108 may deassert the OCG_En signal, thus stopping clock generator 104. SPMC 108 may then assert the Firewall_Ctrl signal to turn on firewall protection circuitry 120 and isolate level shifters 116 and clock synchronizers 118. SPMC 108 may then disable voltage regulator 106 by de-asserting the OVR_En signal. The signal Subs_Vcc may go to zero indicating that voltage regulator 106 is off. Subsystem 102 may now be in a 0v suspend state, thus requiring virtually zero power. In some embodiments, only SPMC 108 and wake detection circuitry 122 may be active at this point. However, if a wake event is detected, the sequence may be aborted and an alternative sequence may be initiated as is described below.

Figure 5:
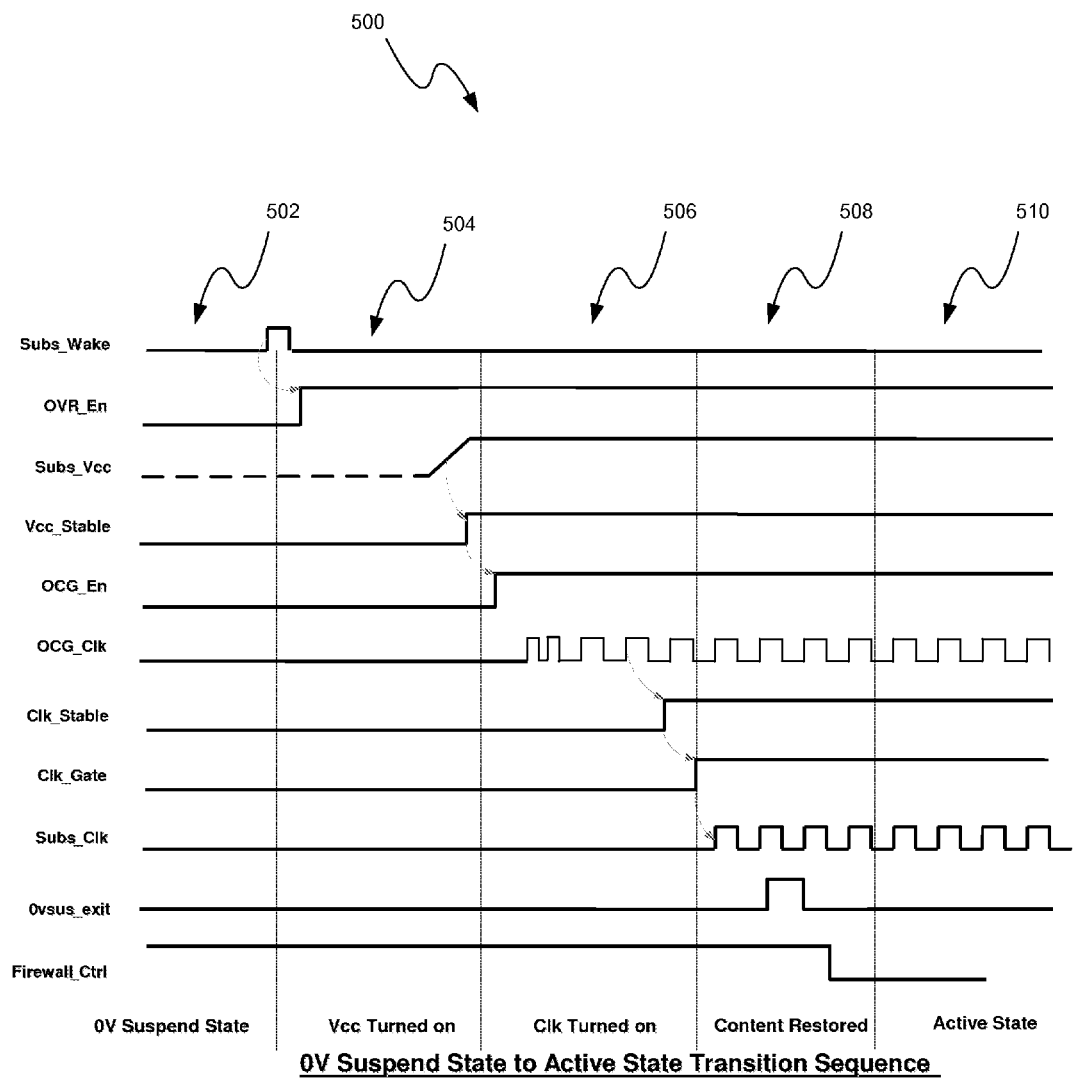
FIG. 5 is a timing diagram illustrating a transition sequence from a suspended state to an active state.

FIG. 5 depicts another exemplary timing diagram 500 of a transition from the 0v suspend state to an active state. This transition sequence shows a number of signals during various time periods including the 0v suspend state 502, Vcc on 504, Clock on 506, Content restored 508 and active state 510 intervals. In operation, if wake detect circuitry 122 identifies an activity somewhere within subsystem 102, such as at an interface (e.g., upstream interface 112 or downstream interface 114), which may require a response from subsystem 102, it may generate a Subs_Wake signal. Upon receipt of the Subs_Wake signal, SPMC 108 may assert the OVR_en signal to activate voltage regulator 106. Once voltage regulator 106 has reached a stable voltage, it may output a Vcc_Stable signal to SPMC 108. SPMC 108 may then enable clock generator 104 by asserting the OCG_En signal. If the clock output of clock generator 104 reaches a target frequency it may assert the Clk_stable signal. SPMC 108 may then assert the CLK_Gate signal to activate the Subs_Clk signal and provide clocking to subsystem 102. The 0vsus_exit signal may be asserted by SPMC 108 causing UDFFs 110 to restore their stored content. SPMC 108 may then deassert the Firewall_Ctrl signal and turn off the firewall protection circuitry 120. Subsystem 102 may now be in an active state and may be configured to respond to any pending interface request. In some embodiments, the total transition time from 0v suspend state to active state may be less than 0.5 μs.

Figure 6:
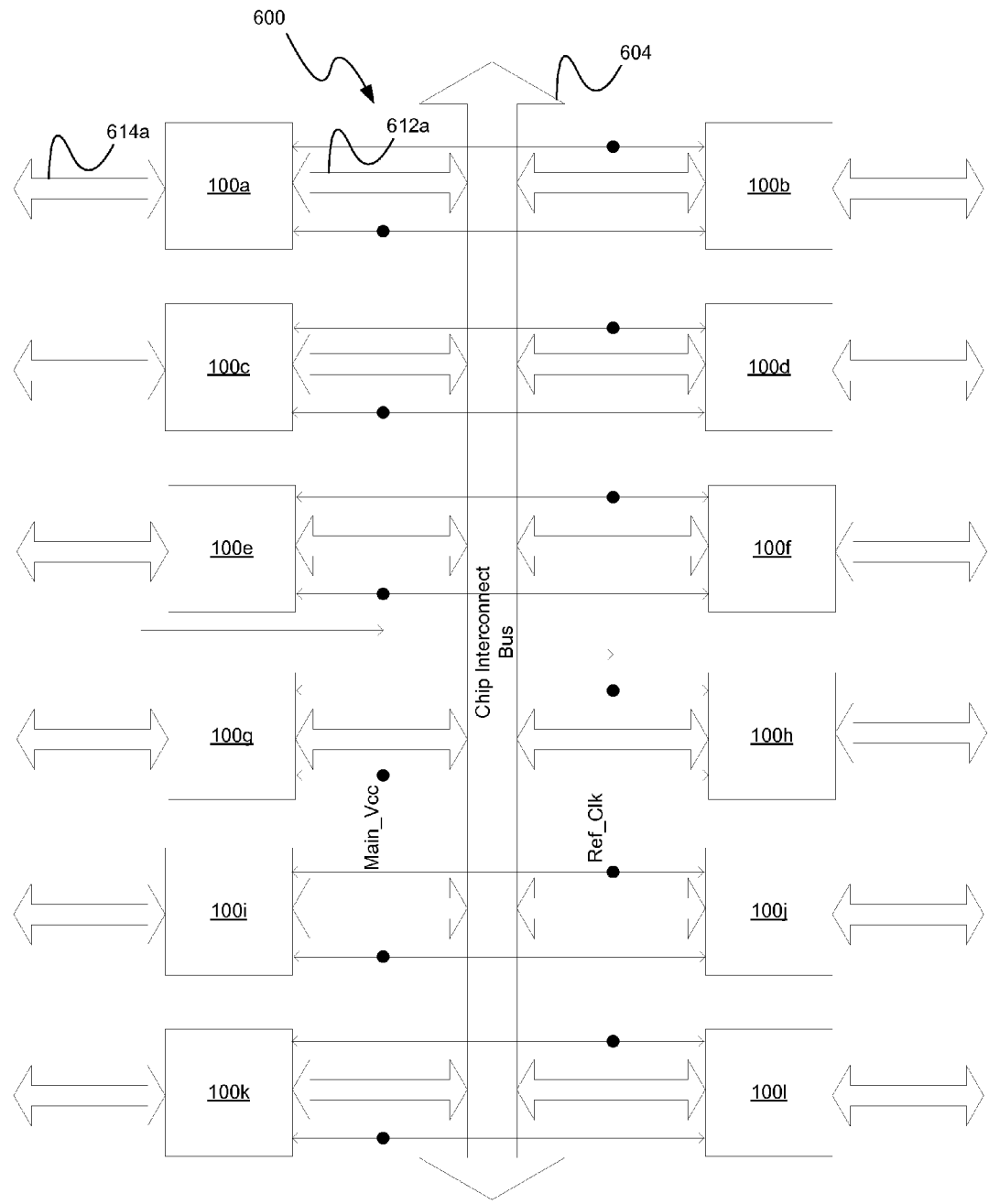
FIG. 6 depicts an exemplary integrated circuit (IC) system embodiment consistent with the present disclosure.

FIG. 6 depicts an exemplary integrated circuit (IC) system embodiment 600 consistent with the present disclosure. This embodiment depicts the subsystem 100 of FIG. 1 implemented in an integrated circuit. The IC 600 may include a plurality of subsystems e.g., 100a, 100b, . . . , 100I coupled together to form a larger system. The functionality of the individual subsystems depicted in this embodiment may differ, but each may operate in a manner described above with reference to FIGS. 1-5. Each subsystem may be coupled together via a chip interconnect bus 604. In some embodiments one common voltage (e.g., power supply such as Main_Vcc) may be applied to each of subsystems 100(a-I), thus removing the need to route individual voltage planes to each of subsystems 100(a-I). IC 600 may further include a clock tree having the Ref_Clk signal routed to subsystems 100(a-I).

Figure 7:
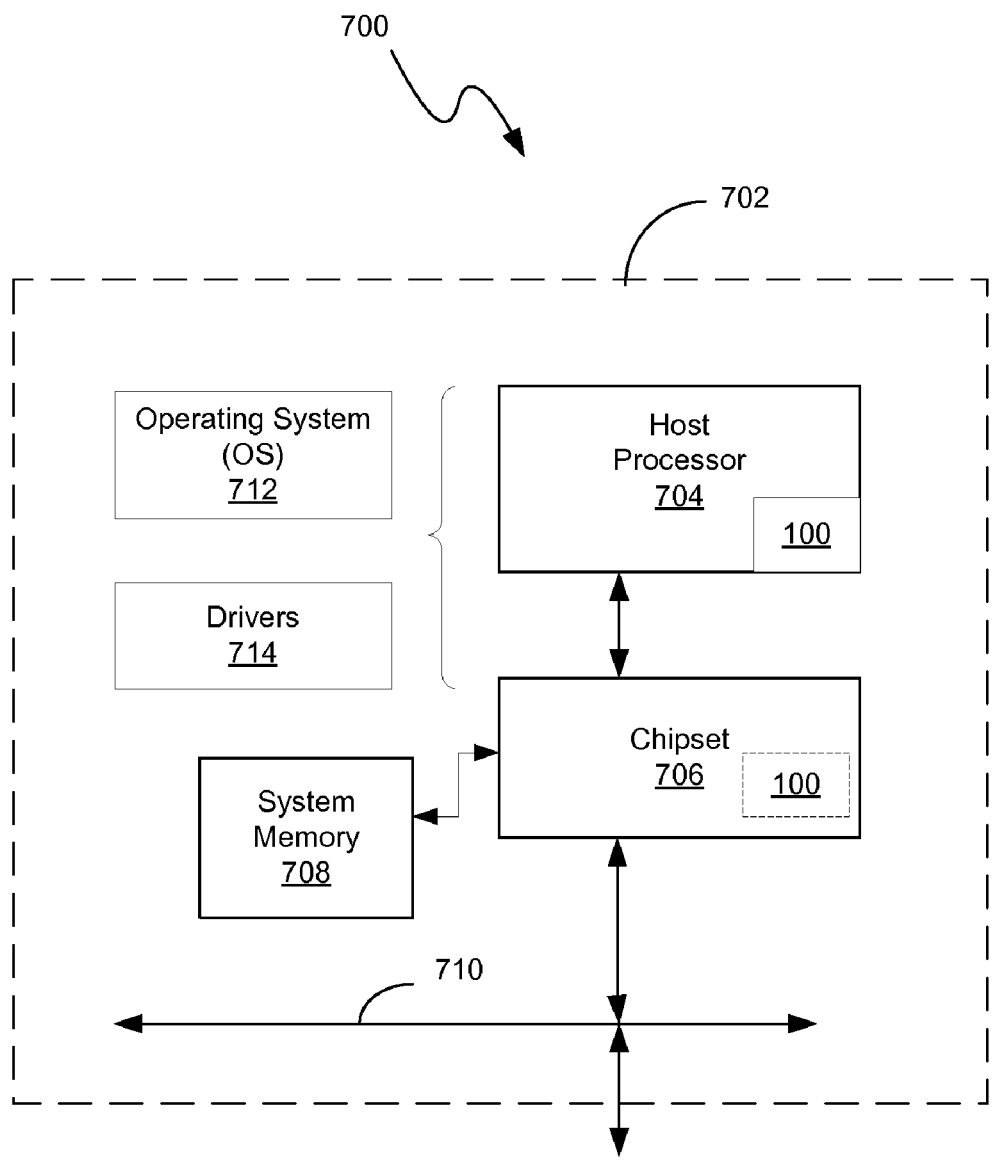
FIG. 7 depicts an exemplary system embodiment consistent with the present disclosure.

FIG. 7 depicts an exemplary system embodiment 700 consistent with the present disclosure. This embodiment may include a host system 702 that include a host processor 704, chipset circuitry 706 and system memory 708. Host processor 704 may be configured to execute an operating system (OS) 712 and/or application drivers 714 (which may include, for example, application software). In this embodiment, host processor 704 and/or chipset circuitry 706 may at least one subsystem 100 that includes the operable components described above with reference to FIGS. 1-5.

Host processor 704 may include any variety of processors, for example, an Intel® Pentium® dual core processor commercially available from the Assignee of the subject application. OS 712 may include, for example, a general operating system such as Microsoft® Windows® XP, commercially available from Microsoft Corporation, and/or other "shrink-wrap" operating system such as Linux, etc. Alternatively, OS 714 an embedded operating system. The embedded OS may include, for example, a Berkely Software Distribution (BSD) operating system. For example, the embedded OS may comply or be compatible with OpenBSD Version 3.9, Released May 1, 2006 by the OpenBSD Organization and/or earlier and/or later versions of the OpenBSD operating system. Alternatively or additionally, the embedded OS may comply or be compatible with NetBSD® Release 3.0.1, Released Aug. 17, 2006 by the NetBSD® Foundation, Inc. and/or earlier and/or later versions of the NetBSD® operating system. Alternatively or additionally, the embedded OS may comply or be compatible with FreeBSD Release 6.1, Released May 8, 2006 by the FreeBSD Project and/or earlier and/or later versions of the FreeBSD operating system. Alternatively or additionally, OS 106 may also comply or be compatible with Linux Operating System, Version 2.6, Released Jun. 18, 2006 by the Linux Organization and/or earlier and/or later versions of the Linux operating system. Alternatively or additionally, the embedded OS may comply or be compatible with Microsoft® Windows® CE (WinCE) operating system Version 5.0, commercially available from Microsoft Corporation, and/or earlier and/or later versions of the WinCE operating system. Alternatively or additionally, the embedded OS may comply or be compatible with VxWorks operating system Version 1.0, commercially available from Wind River Corporation, and/or earlier and/or later versions of the VxWorks operating system operating system. Alternatively or additionally, the embedded OS may comply or be compatible with ThreadX® operating system Version 1.0, commercially available from Express Logic, Inc., and/or earlier and/or later versions of the ThreadX® operating system operating system. Alternatively or additionally, the embedded OS may comply or be compatible with RTLinux® operating system Version 3.0, commercially available from FSM Labs, Inc., and/or earlier and/or later versions of the RTLinux® operating system. Of course, the embedded OS may comply or be compatible with different operating systems (such as, for example, alternative run time and/or real time operating systems) without departing from this embodiment. Further, the second partition 108 may be configured to operate without an operating system, using, for example, Extensible Firmware Interface (EFI) that complies or is compatible with the Extensible Firmware Interface Specification, Version 2.0, Released Jan. 31, 2006 by the Unified EFI (UEFI) Forum and/or earlier and/or later versions of the EFI specification. Of course, the foregoing are only examples of operating systems that may be executed by the host processor 704 and the embodiments of the present disclosure are not limited to any specific operating system.

The operating system 712 may include power management features which, when executed by the host processor 704 and/or chipset circuitry 706 may cause the host processor 704 and/or chipset circuitry 706 to enter into one or more power management states. In this embodiment, subsystem power management circuitry 108 of the subsystem 100 may be configured to operate independently of an the host processor 704 and/or chipset circuitry 706, and/or other components of the host system 702.

Chipset circuitry 706 may be configured to coupled host processor 704 and system memory 708 together, and may also be configured to coupled host processor 704 and system memory 708 to a bus 710. Chipset circuitry 706 may be configured as an I/O controller hub, which may include "North Bridge" chipset features (for example, memory and processor I/O control) and/or "South Bridge" chipset features (for example, peripheral device and bus I/O control). Of course, chipset circuitry 706 may include additional features, for example, video I/O control, audio I/O control and/or other chipset functionality. Chipset circuitry 706 may include one or more integrated circuit (IC) chips, such as those selected from integrated circuit chipsets commercially available from the assignee of the subject application (e.g., graphics memory and I/O controller hub chipsets), although other integrated circuit chips may also, or alternatively be used. Bus 710 may comply or be compatible with Peripheral Component Interconnect (PCI) Express™ Base Specification Revision 1.0, published Jul. 22, 2002 available from the PCI Special Interest Group, Portland, Oreg., U.S.A.).

Figure 8:
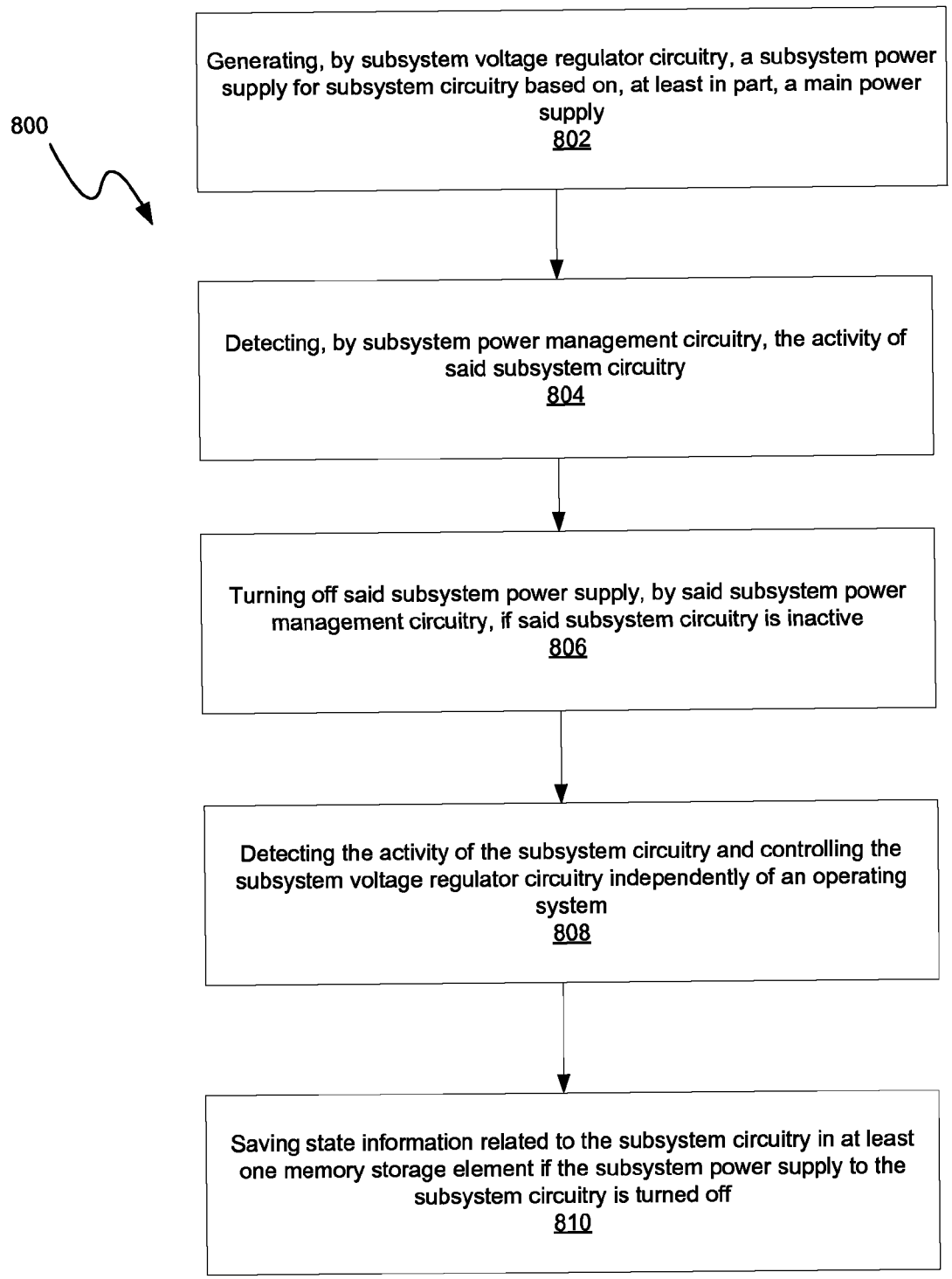
FIG. 8 depicts a flowchart of exemplary operations consistent with the present disclosure.

FIG. 8 depicts a flowchart 800 of exemplary operations consistent with the present disclosure. Operations may include generating, by subsystem voltage regulator circuitry, a subsystem power supply for subsystem circuitry based on, at least in part, a main power supply 802. Operations may also include detecting, by subsystem power management circuitry, the activity of said subsystem circuitry 804. Operations may additionally include turning off said subsystem power supply, by said subsystem power management circuitry, if said subsystem circuitry is inactive 806. Operations may further include detecting the activity of the subsystem circuitry and controlling the subsystem voltage regulator circuitry independently of an operating system 808. Operations may additionally include saving state information related to the subsystem circuitry in at least one memory storage element if the subsystem power supply to the subsystem circuitry is turned off 810.

FIG. 9 depicts another flowchart 900 of exemplary operations consistent with the present disclosure. Operations may include restoring state information stored in at least one memory storage element of subsystem circuitry if subsystem power management circuitry detects activity of the subsystem circuitry 902. Operations may also include controlling subsystem voltage regulator circuitry, by subsystem power management circuitry, to turn on a subsystem power supply if activity of subsystem circuitry is detected 904.

Any of the operations and/or methods described herein may be implemented in a computer program that may be stored on a storage medium having instructions to program a system (e.g., a machine) to perform these operations and/or methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The present disclosure may provide numerous advantages. For example, the present disclosure may conserve platform level power by turning off subsystem voltage regulators and clock generators along with a particular subsystem. In addition, the operations described herein may be implemented independently from an operating system or other software (e.g. drivers, BIOS, etc.). Further, the content restoration of the UDFFs 110 may produce an overall exit latency of less than 0.5 μs. The response time of clock generator 104 and voltage regulator 106 coupled with the storage capabilities of UDFF 110 provide a subsystem 100 that may consume power only when performing a particular task. Subsystem circuitry 102 may require virtually zero power in certain states. For example, subsystem circuitry 102 may include an active state and a 0v suspend state. In the active state, the Subs_Clk and Subs_Vcc signals may be enabled and subsystem circuitry 102 may be executing various tasks. Some of these tasks may include, but are not limited to, responding to I/O register accesses and executing instructions in an internal microcontroller. Alternatively, in the 0v suspend state, both the Subs_Clk and Subs_Vcc signals may be deasserted. However, the Main_Vcc and Ref_Clk may remain on in this state, which may allow memory storage elements 110 to retain their content.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operative components described in any embodiment herein may also be implemented in software, firmware, hardwired circuitry and/or any combination thereof. Also, "integrated circuit", as used in any embodiment herein, may mean a semiconductor device and/or microelectronic device, such as, for example, a semiconductor integrated circuit chip.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus, comprising:
   an integrated circuit (IC) comprising a plurality of subsystems, at least one subsystem comprising:
   subsystem circuitry configured to perform at least one function of said IC, said subsystem circuitry comprising at least one memory storage element;

subsystem voltage regulator circuitry configured to generate a subsystem power supply for said subsystem circuitry based on, at least in part, a main power supply; and subsystem power management circuitry configured to detect the activity of said subsystem circuitry and; said subsystem power management circuitry is further configured to control said subsystem voltage regulator circuitry to turn off said subsystem power supply, if said subsystem circuitry is inactive;

said at least one memory storage element configured to save state information related to said subsystem circuitry if said subsystem power supply is turned off;

said subsystem power management circuitry is further configured to detect activity of said subsystem circuitry and control said voltage regulator circuitry independently of an operating system.

2. The apparatus of claim 1, wherein said IC further comprising:

clock generator circuitry configured to generate a subsystem clock signal for said subsystem based on, at least in part, a reference clock signal; said subsystem power management circuitry is further configured to turn off said subsystem clock signal if said subsystem circuitry is inactive.

3. The apparatus of claim 1, wherein:

said at least one memory storage element comprises ultra drowsy flip-flip (UDFF) circuitry.

4. The apparatus of claim 1, wherein:

said memory storage element is configured to restore said state information related to said subsystem circuitry if said subsystem power management circuitry detects activity of said subsystem circuitry.

5. The apparatus of claim 1, wherein:

said subsystem power management circuitry is further configured to control said subsystem voltage regulator circuitry to turn on said subsystem power supply if activity of subsystem circuitry is detected.

6. The apparatus of claim 1, wherein:

said subsystem circuitry further comprises wake detection circuitry, said wake detection circuitry is configured to receive one or more signals from another subsystem and generate a wake event signal indicative of activity of said subsystem circuitry.

7. A system, comprising:

an integrated circuit (IC) comprising a plurality of subsystems, at least one subsystem comprising:

subsystem circuitry configured to perform at least one function of said IC, said subsystem circuitry comprising at least one memory storage element;

subsystem voltage regulator circuitry configured to generate a subsystem power supply for said subsystem circuitry based on, at least in part, a main power supply; and subsystem power management circuitry configured to detect the activity of said subsystem circuitry and; said subsystem power management circuitry is further configured to control said subsystem voltage regulator circuitry to turn off said subsystem power supply, if said subsystem circuitry is inactive;

said at least one memory storage element configured to save state information related to said subsystem circuitry if said subsystem power supply to said subsystem circuitry is turned off; and an operating system comprising at least one instruction executed by said (IC); said subsystem power management circuitry is further configured to detect activity of said subsystem circuitry and control said voltage regulator circuitry independently of said operating system.

8. The system of claim 7, wherein said IC further comprising:

clock generator circuitry configured to generate a subsystem clock signal for said subsystem based on, at least in part, a reference clock signal; said subsystem power management circuitry is further configured to turn off said subsystem clock signal if said subsystem circuitry is inactive.

9. The system of claim 7, wherein:

said at least one memory storage element comprises ultra drowsy flip-flip (UDFF) circuitry.

10. The system of claim 7, wherein:

said memory storage element is configured to restore said state information related to said subsystem circuitry if said subsystem power management circuitry detects activity of said subsystem circuitry.

11. The system of claim 7, wherein:

said subsystem power management circuitry is further configured to control said subsystem voltage regulator circuitry to turn on said subsystem power supply if activity of subsystem circuitry is detected.

12. The system of claim 7, wherein:

said subsystem circuitry further comprises wake detection circuitry, said wake detection circuitry is configured to receive one or more signals from another subsystem and generate a wake event signal indicative of activity of said subsystem circuitry.

13. A method, comprising:

generating, by subsystem voltage regulator circuitry, a subsystem power supply for subsystem circuitry based on, at least in part, a main power supply;

detecting, by subsystem power management circuitry, the activity of said subsystem circuitry, and detecting the activity of said subsystem circuitry and controlling said subsystem voltage regulator circuitry independently of an operating system; and turning off said subsystem power supply, by said subsystem power management circuitry, if said subsystem circuitry is inactive;

saving state information related to said subsystem circuitry in at least one memory storage element if said subsystem power supply to said subsystem circuitry is turned off.

14. The method of claim 13, further comprising:

generating, by clock generator circuitry, a subsystem clock signal for said subsystem circuitry based on, at least in part, a reference clock signal; and turning off said subsystem clock signal, by said subsystem power management signal, if said subsystem circuitry is inactive.

15. The method of claim 13, further comprising:

restoring said state information related to said subsystem circuitry if said subsystem power management circuitry detects activity of said subsystem circuitry.

16. The method of claim 13, further comprising:

controlling said subsystem voltage regulator circuitry, by said subsystem power management circuitry, to turn on said subsystem power supply if activity of subsystem circuitry is detected.

17. The method of claim 13, further comprising:

receiving, by wake detection circuitry, one or more signals from another subsystem and generating a wake event signal indicative of activity of said subsystem circuitry.

18. An article, comprising:
a storage medium storing instructions that when executed by a machine result in the following operations:
generating, by subsystem voltage regulator circuitry, a subsystem power supply for subsystem circuitry based on, at least in part, a main power supply;
detecting, by subsystem power management circuitry, the activity of said subsystem circuitry,
detecting the activity of said subsystem circuitry and controlling said voltage regulator circuitry independently of an operating system; and
turning off said subsystem power supply, by said subsystem power management circuitry, if said subsystem circuitry is inactive;
saving state information related to said subsystem circuitry in at least one memory storage element if said subsystem power supply to said subsystem circuitry is turned off.

19. The article of claim 18, further comprising:
generating, by clock generator circuitry, a subsystem clock signal for said subsystem circuitry based on, at least in part, a reference clock signal; and
turning off said subsystem clock signal, by said subsystem power management signal, if said subsystem circuitry is inactive.

20. The article of claim 18, further comprising:
restoring said state information related to said subsystem circuitry if said subsystem power management circuitry detects activity of said subsystem circuitry.

21. The article of claim 18, further comprising:
controlling said subsystem voltage regulator circuitry, by said subsystem power management circuitry, to turn on said subsystem power supply if activity of subsystem circuitry is detected.

22. The article of claim 18, further comprising:
receiving, by wake detection circuitry, one or more signals from another subsystem and generating a wake event signal indicative of activity of said subsystem circuitry.

* * * * *